(12) United States Patent
Richardson

(10) Patent No.: US 10,758,849 B2
(45) Date of Patent: Sep. 1, 2020

(54) THREE DIMENSIONAL FILTER DEVICES AND APPARATUSES

(71) Applicant: Imagine TF, LLC, Los Gatos, CA (US)

(72) Inventor: Brian Edward Richardson, Los Gatos, CA (US)

(73) Assignee: Imagine TF, LLC, Los Gatos, CA (US)

(*) Notice: Subject to any disclaimer, the term of this patent is extended or adjusted under 35 U.S.C. 154(b) by 91 days.

(21) Appl. No.: 15/045,119

(22) Filed: Feb. 16, 2016

(65) Prior Publication Data
US 2016/0236120 A1 Aug. 18, 2016

Related U.S. Application Data

(60) Provisional application No. 62/176,420, filed on Feb. 18, 2015.

(51) Int. Cl.
*B01D 29/46* (2006.01)
*B01D 35/06* (2006.01)

(52) U.S. Cl.
CPC ............. *B01D 29/46* (2013.01); *B01D 35/06* (2013.01)

(58) Field of Classification Search
CPC ...................................................... B01D 29/46
See application file for complete search history.

(56) References Cited

U.S. PATENT DOCUMENTS

| | | |
|---|---|---|
| 1,977,174 A | 10/1934 | Crawford |
| 3,250,396 A | 5/1966 | Armstrong et al. |
| 3,335,946 A | 8/1967 | Putterlik |
| 3,884,805 A | 5/1975 | Bagdasarian et al. |
| 3,948,779 A | 4/1976 | Jackson |
| 4,267,045 A * | 5/1981 | Hoof ...................... B01D 25/26 137/625.37 |
| 4,410,430 A | 10/1983 | Hagler, Jr. |
| 4,423,090 A | 12/1983 | Hammond, Jr. et al. |

(Continued)

FOREIGN PATENT DOCUMENTS

| | | | |
|---|---|---|---|
| CN | 203139755 U | 8/2013 | |
| DE | 1270004 B * | 6/1968 | ............. B01D 29/46 |

(Continued)

OTHER PUBLICATIONS

English Machine Translation of CN 203139755.*

(Continued)

*Primary Examiner* — Jason M Greene
*Assistant Examiner* — Eric J McCullough
(74) *Attorney, Agent, or Firm* — Keith Kline; The Kline Law Firm PC

(57) ABSTRACT

Three dimensional filter devices and devices are provided herein. An example substrate includes a primary inlet boundary and a primary outlet boundary, as well as a plurality of filter rows that include microstructure filter members that remove particulate matter from a fluid flowing across or through the substrate; the fluid entering through the inlet boundary and exiting through the outlet boundary. Each of the microstructure filter members includes a secondary inlet channel and a secondary outlet channel that couple to adjacent microstructure filter members.

21 Claims, 18 Drawing Sheets

(56) References Cited

U.S. PATENT DOCUMENTS

| | | | |
|---|---|---|---|
| 4,430,232 A * | 2/1984 | Doucet | B01D 29/15 210/351 |
| 4,478,769 A | 10/1984 | Pricone et al. | |
| 4,486,363 A | 12/1984 | Pricone et al. | |
| 4,601,861 A | 7/1986 | Pricone et al. | |
| 4,620,917 A | 11/1986 | Nozawa et al. | |
| 4,668,558 A | 5/1987 | Barber | |
| 4,797,175 A | 1/1989 | Ellion et al. | |
| 4,842,739 A | 6/1989 | Tang | |
| 4,842,794 A | 6/1989 | Hovis et al. | |
| 4,891,120 A | 1/1990 | Sethi et al. | |
| 4,902,420 A | 2/1990 | Pall et al. | |
| 4,960,449 A | 10/1990 | Yonushonis | |
| 4,971,769 A | 11/1990 | Haerle | |
| 5,009,857 A | 4/1991 | Haerle | |
| 5,100,551 A | 3/1992 | Pall et al. | |
| 5,200,073 A | 4/1993 | Steere et al. | |
| 5,204,690 A | 4/1993 | Lorenze, Jr. et al. | |
| 5,207,962 A | 5/1993 | Hovis et al. | |
| 5,262,107 A | 11/1993 | Hovis et al. | |
| 5,290,447 A | 3/1994 | Lippold | |
| 5,505,852 A | 4/1996 | van Rossen | |
| 5,552,046 A | 9/1996 | Johnston et al. | |
| 5,568,819 A | 10/1996 | Gentry et al. | |
| 5,645,704 A | 7/1997 | Axtman | |
| 5,858,231 A * | 1/1999 | Drori | B01D 25/26 210/411 |
| 5,985,164 A | 11/1999 | Chu et al. | |
| 6,273,938 B1 | 8/2001 | Fanselow et al. | |
| 6,274,035 B1 | 8/2001 | Yuan et al. | |
| 6,284,072 B1 | 9/2001 | Ryan et al. | |
| 6,306,300 B1 | 10/2001 | Harding et al. | |
| 6,346,192 B2 | 2/2002 | Buhr et al. | |
| 6,375,870 B1 | 4/2002 | Visovsky et al. | |
| 6,391,097 B1 * | 5/2002 | Rosenberg | B01D 29/46 210/492 |
| 6,471,746 B2 | 10/2002 | Hagglund et al. | |
| 6,524,488 B1 | 2/2003 | Insley et al. | |
| 6,589,317 B2 | 7/2003 | Zhang et al. | |
| 6,632,357 B1 | 10/2003 | Barger et al. | |
| 6,685,833 B2 | 2/2004 | Lippold | |
| 6,685,841 B2 | 2/2004 | Lopez et al. | |
| 6,746,890 B2 | 6/2004 | Gupta et al. | |
| 6,748,978 B2 | 6/2004 | Pezzuto et al. | |
| 6,752,889 B2 | 6/2004 | Insley et al. | |
| 6,761,962 B2 | 7/2004 | Bentsen et al. | |
| 6,827,906 B1 | 12/2004 | Bjornson et al. | |
| 6,872,302 B2 | 3/2005 | Aste | |
| 6,915,566 B2 | 7/2005 | Abbott et al. | |
| 6,936,086 B2 | 8/2005 | Harkonen et al. | |
| 6,977,042 B2 * | 12/2005 | Kadel | B05B 15/40 210/321.86 |
| 7,032,426 B2 | 4/2006 | Durney et al. | |
| 7,048,848 B2 | 5/2006 | Assion | |
| 7,081,208 B2 | 7/2006 | McCullough et al. | |
| 7,104,406 B2 | 9/2006 | Chen et al. | |
| 7,122,068 B2 | 10/2006 | Tate et al. | |
| 7,163,733 B2 | 1/2007 | Bourdelais et al. | |
| 7,217,562 B2 | 5/2007 | Cao et al. | |
| 7,223,364 B1 | 5/2007 | Johnston et al. | |
| 7,238,255 B2 | 7/2007 | Derand et al. | |
| 7,282,148 B2 | 10/2007 | Dalton et al. | |
| 7,323,105 B1 | 1/2008 | Janikowski et al. | |
| 7,425,227 B1 | 9/2008 | Hutchison et al. | |
| 7,442,303 B2 | 10/2008 | Jacobson | |
| 7,531,120 B2 | 5/2009 | Van Rijn et al. | |
| 7,569,139 B2 | 8/2009 | Mihlbauer et al. | |
| 7,588,619 B2 | 9/2009 | Chilton et al. | |
| 7,645,383 B2 | 1/2010 | Kadel et al. | |
| 7,784,619 B2 | 8/2010 | Jacobson | |
| 7,857,978 B2 | 12/2010 | Jensen et al. | |
| 7,901,758 B2 | 3/2011 | Rasmussen | |
| 7,922,795 B2 | 4/2011 | Striemer et al. | |
| 7,959,780 B2 | 6/2011 | Hawkins et al. | |
| 7,988,840 B2 | 8/2011 | Huang et al. | |
| 8,025,854 B2 | 9/2011 | Ohman et al. | |
| 8,083,941 B2 | 12/2011 | Chien | |
| 8,179,381 B2 | 5/2012 | Frey et al. | |
| 8,186,913 B2 | 5/2012 | Toner et al. | |
| 8,197,775 B2 | 6/2012 | Johnston et al. | |
| 8,273,245 B2 | 9/2012 | Jovanovic et al. | |
| 8,277,759 B2 | 10/2012 | Sundberg et al. | |
| 8,282,799 B2 | 10/2012 | Huang et al. | |
| 8,297,449 B2 | 10/2012 | Afzali-Ardakani et al. | |
| 8,304,230 B2 | 11/2012 | Toner et al. | |
| 8,328,022 B2 | 12/2012 | Mbadinga-Mouanda et al. | |
| 8,679,336 B2 | 3/2014 | Hongo et al. | |
| 2002/0060183 A1 | 5/2002 | Paul et al. | |
| 2002/0125192 A1 | 9/2002 | Lopez et al. | |
| 2002/0185003 A1 | 12/2002 | Potter | |
| 2003/0104170 A1 | 6/2003 | Johnston et al. | |
| 2003/0118781 A1 | 6/2003 | Insley et al. | |
| 2004/0159319 A1 | 8/2004 | Kadel et al. | |
| 2005/0179150 A1 | 8/2005 | Bharadwaj et al. | |
| 2006/0219627 A1 | 10/2006 | Rodgers et al. | |
| 2007/0020772 A1 | 1/2007 | Cao et al. | |
| 2007/0151920 A1 | 7/2007 | Kay | |
| 2007/0246433 A1 | 10/2007 | Zuberi | |
| 2007/0251867 A1 | 11/2007 | Mihlbauer et al. | |
| 2008/0012151 A1 | 1/2008 | Kemppainen et al. | |
| 2008/0014410 A1 | 1/2008 | Johnston et al. | |
| 2008/0296238 A1 | 12/2008 | Haldopoulos et al. | |
| 2009/0102094 A1 | 4/2009 | Golden et al. | |
| 2009/0120874 A1 | 5/2009 | Jensen et al. | |
| 2009/0149345 A1 | 6/2009 | Nishi et al. | |
| 2010/0028604 A1 | 2/2010 | Bhushan et al. | |
| 2010/0216126 A1 | 8/2010 | Balachandran et al. | |
| 2010/0317132 A1 | 12/2010 | Rogers et al. | |
| 2011/0100900 A1 | 5/2011 | Drury et al. | |
| 2011/0240476 A1 | 10/2011 | Wang et al. | |
| 2012/0006760 A1 | 1/2012 | Toner et al. | |
| 2012/0037544 A1 | 2/2012 | Lane et al. | |
| 2012/0244311 A1 | 9/2012 | Manninen | |
| 2012/0244314 A1 | 9/2012 | Scheibner et al. | |
| 2012/0261331 A1 | 10/2012 | Ter Horst et al. | |
| 2012/0261333 A1 | 10/2012 | Moran et al. | |
| 2012/0267249 A1 | 10/2012 | Cotte et al. | |
| 2012/0273990 A1 | 11/2012 | O'Donnell et al. | |
| 2013/0008848 A1 | 1/2013 | Jonsson et al. | |
| 2013/0078163 A1 | 3/2013 | Chung et al. | |
| 2014/0221544 A1 | 8/2014 | Lichtenhan et al. | |
| 2014/0224658 A1 | 8/2014 | Richardson | |
| 2015/0367257 A1 | 12/2015 | Richardson | |
| 2016/0067634 A1 | 3/2016 | Richardson | |
| 2017/0008781 A1 | 1/2017 | Richardson | |

FOREIGN PATENT DOCUMENTS

| | | | |
|---|---|---|---|
| EP | 0639223 B1 | 2/1995 | |
| EP | 1196242 A1 | 4/2002 | |
| EP | 1197255 A1 | 4/2002 | |
| EP | 1254689 B1 | 11/2002 | |
| EP | 1449585 A1 | 8/2004 | |
| EP | 2505047 A2 | 10/2012 | |
| FR | 2973257 A1 * | 10/2012 | B01D 25/26 |
| WO | WO2011066055 A2 | 6/2011 | |
| WO | WO2014116183 A1 | 7/2014 | |
| WO | WO2015105524 A1 | 7/2015 | |
| WO | WO2015199663 A1 | 12/2015 | |
| WO | WO2016037150 A1 | 3/2016 | |
| WO | WO2016133929 A1 | 8/2016 | |
| WO | WO2017007734 A1 | 1/2017 | |

OTHER PUBLICATIONS

Brown, R.C. "Electrically Charged Filter Materials." Engineering Science and Education Journal 1.2 (1992): 71.*
English Translation of DE-1270004-B.*
English Machine Translation of FR-2973257-A1.*
International Search Report and Written Opinion dated May 19, 2016 in Application No. PCT/US2016/018119, filed Feb. 16, 2016, 10 pages.

(56) References Cited

OTHER PUBLICATIONS

International Search Report and Written Opinion dated Aug. 28, 2014 in Application No. PCT/US2014/036439, filed May 1, 2014.
International Search Report and Written Opinion dated Dec. 1, 2014 in Application No. PCT/US2014/043942, filed Jun. 24, 2014.
International Search Report and Written Opinion dated Dec. 17, 2015 in Application No. PCT/US2015/048723, filed Sep. 4, 2015.
Patent Cooperation Treaty Application No. PCT/US2016/040878, "International Search Report" and "Written Opinion of the International Searching Authority," dated Sep. 19, 2016, 11 pages.
Non-Final Office Action, dated Dec. 21, 2016, U.S. Appl. No. 14/701,528, filed May 1, 2015.
Non-Final Office Action, dated Jan. 12, 2017, U.S. Appl. No. 14/313,924, filed Jun. 25, 2014.
Non-Final Office Action, dated Jan. 25, 2017, U.S. Appl. No. 15/233,701, filed Aug. 10, 2016.

\* cited by examiner

THREE DIMENSIONAL FILTER DEVICES AND APPARATUSES

CROSS REFERENCE TO RELATED APPLICATIONS

This application claims the benefit and priority of U.S. Provisional Application 62/176,420, filed on Feb. 18, 2015, which is hereby incorporated by reference herein in its entirety, including all reference and appendices cited therein.

FIELD OF TECHNOLOGY

The present disclosure is generally directed to three dimensional filter devices and apparatuses/structures incorporating the same. In some embodiments, the filter devices are stackable to create filter apparatuses. These filter apparatuses can be collapsed for filtering a fluid and expanded for cleaning.

SUMMARY

According to some embodiments, the present disclosure is directed to a filter device comprising: (a) a substrate comprising a primary inlet boundary and a primary outlet boundary; (b) a plurality of filter rows, each of the plurality filter rows comprising: (i) microstructure filter members that remove particulate matter from a fluid flowing across or through the substrate, the fluid entering through the inlet boundary and exiting through the outlet boundary, wherein each of the microstructure filter members comprises a secondary inlet channel and a secondary outlet channel that couple to adjacent microstructure filter members.

According to some embodiments, the present disclosure is directed to a filter device comprising: a substrate having an upper surface and a lower surface, the substrate comprising a plurality of filter rows disposed on any of the upper surface, the lower surface, and combinations thereof; each of the plurality filter rows comprising microstructure filter members that remove particulate matter from a fluid flowing across or through the substrate; the plurality filter rows being arranged onto the upper surface to form v-shaped grooves that define primary channels.

In one embodiment, a filter device is comprised of a plurality of the filter devices arranged into a stacked configuration. In some embodiments, adjacent ones of the plurality of the filter devices are spaced apart with resilient spacers that allow the substrates to be collapsed into a filtering configuration and expanded to a cleaning configuration.

Another filter device can comprise: (a) a plurality of filter devices, each of the filter devices comprising: (i) an upper surface; (ii) a lower surface; and (iii) a plurality of filter rows disposed on any of the upper surface, the lower surface, and combinations thereof; each of the plurality filter rows comprising microstructure filter members that remove particulate matter from a fluid flowing across or through the substrate; the plurality filter rows being arranged onto the upper surface to form v-shaped grooves that define primary channels.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is generally directed to filters and filtering apparatuses comprised of a plurality of filter devices, and methods for using the same. These filters are used for filtering particular matter from a fluid.

In some embodiments, the filter devices include permutations of primary, secondary, tertiary, and quaternary inlet and/or outlet channels. One or more embodiments comprise rows of microstructure filtering members that filter particulates from a fluid flowing across and/or through various parts of the filter device.

Any fluid that bears particulate matter can be processed using the filter devices and filter structures/apparatuses of the present disclosure.

Figure 1A:
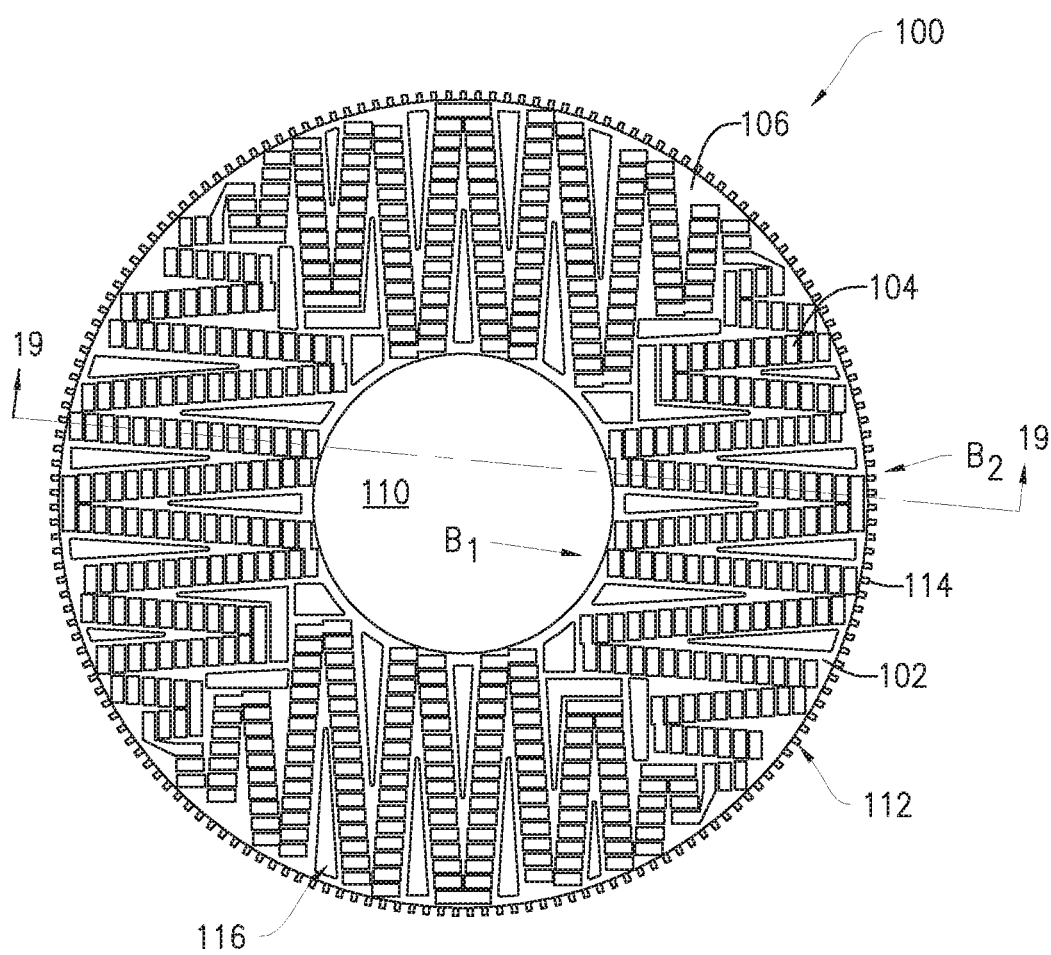
FIG. 1A is a front plan view of an example filter device, constructed in accordance with the present disclosure.
Figure 1B:
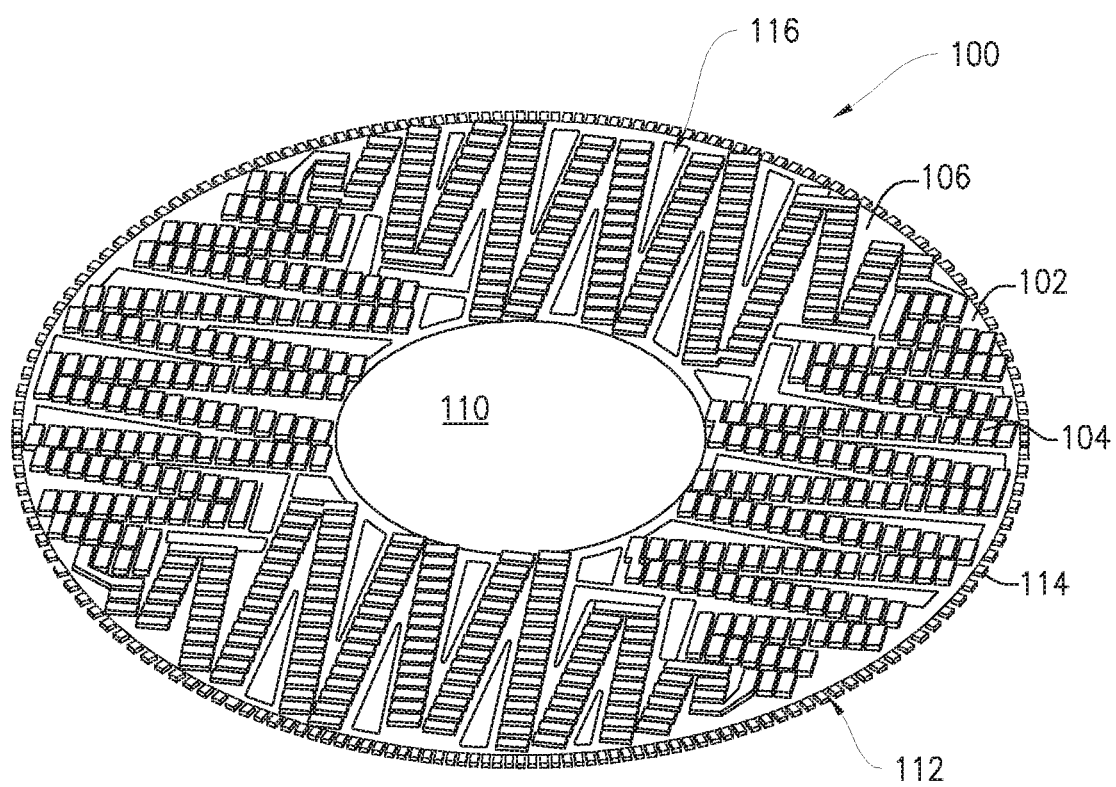
FIG. 1B is a perspective view of an example filter device, constructed in accordance with the present disclosure.

FIGS. 1A and 1B collectively illustrate an example filter device 100. The filter device 100 comprises a base structure 102 and a plurality of filter rows, such as filter row 104. The base structure 102 can include a disk of material manufactured from any desired material. In some embodiments, the base structure 102 can include a dielectric material, whereas in other embodiments a conductive material can be utilized.

In general, the base structure 102 can be charged to attract particles within the fluid. According to some embodiments, the base structure 102 is electrically charged to create an electric field across a fluid as it flows along or through the base structure 102.

The electrical charge can also cause particle attraction in the plurality of filter TOWS.

Rather than using electrical charges, the base structure 102 and/or the plurality of filter rows (and even more specifically the microstructure filter members discussed infra) can be coated or manufactured from a material that causes chemical attraction of particulates rather than (or in addition to) electrical attraction of the particles.

The base structure 102 is provided with an upper surface 106 and a lower surface 108 (illustrated in FIG. 6), which are spaced apart from one another based on a thickness of the base structure 102 and the plurality of filter rows.

While the filter device 100 is illustrated as having an annular shape, the filter device 100 can include any other desired shape such as triangular, rectangular, circular, square, polygonal and irregular.

In one embodiment, the base structure 102 comprises a central aperture 110 that defines either a primary inlet or outlet boundary $B_1$. An outer peripheral edge 112 of the base structure 102 defines a complimentary a primary inlet or outlet boundary $B_2$. Depending on the usage and fluid flow, $B_1$ is the primary inlet and $B_2$ is the primary outlet. In another embodiment, when fluid is flowing in an opposite direction, $B_2$ is the primary inlet and $B_1$ is the primary outlet.

In some embodiments the base structure 102 is ringed with a plurality of rib protrusions, such as protrusion 114 that define spaces that allow for filtering large particles from a fluid. This is advantageous when the primary inlet boundary is defined by the outer peripheral edge 112 of the base structure 102.

In one or more embodiments, the plurality of filter rows can be created by any manufacturing process that allows material to be removed from a blank of material that is transformed into the filter device. In another embodiment, the plurality of filter rows is created from depositing material onto the base structure 102, using any one or more methods which would be known to one of ordinary skill in the art with the present disclosure before them.

In general, the plurality of filter rows provides paths of fluid flow across and through the plurality of filter rows. The plurality of filter rows can be arranged in v-shaped configurations and disposed on the base structure 102 so as to cover a portion of the upper surface 106. In some embodiments, spaces between adjacent filter rows, such as space 116 include an aperture fabricated into the base structure 102 so as to provide a path of fluid communication through the filter device 100, passing from the upper surface 106 to lower surface 108.

Figure 2:
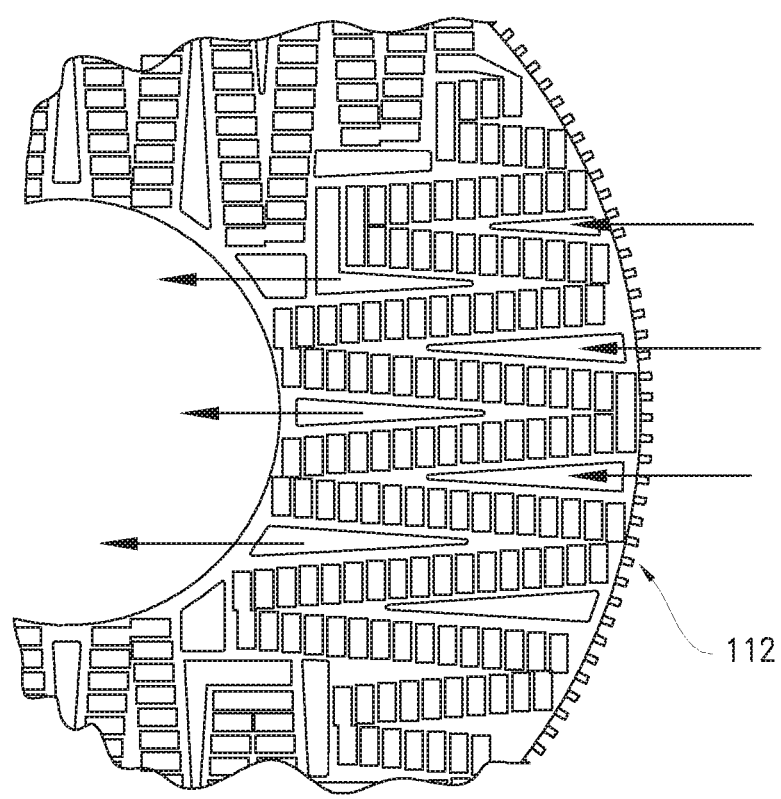
FIG. 2 is a close up view of FIG. 1 illustrating flow across channels of the filter device.

In FIG. 2, spaces, such as space 116 and its corresponding aperture are illustrated along with a fluid flow direction where the primary inlet boundary is defined by the outer peripheral edge 112.

Figure 3:
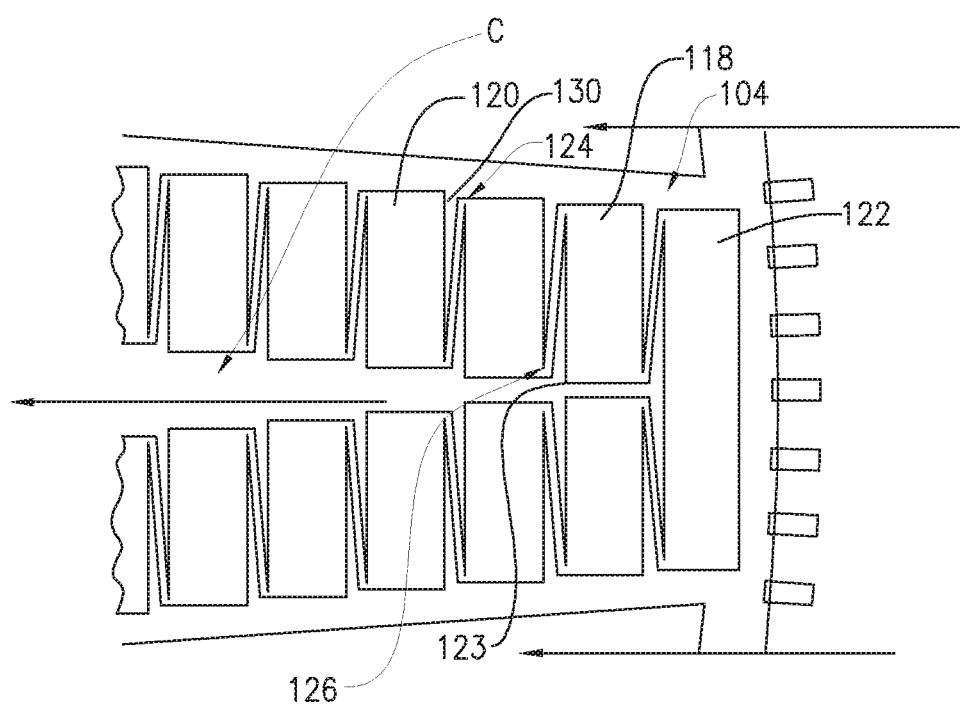
FIG. 3 is a close up view of FIG. 2 illustrating blocks of microstructure filter members of filter rows.

In FIG. 3 adjacent filter rows are illustrated. The filter row 104 comprises microstructure filter members arranged into blocks, such as block 118 and block 120. A primary block 122 links two filter rows together. The microstructures are not illustrated in FIG. 3 for purposes of clarity, but are illustrated in various embodiments herein. In one embodiment block 118 and block 120 are in fluid communication with one another (and other adjacent blocks) using inlet ports and outlet ports, such as outlet port 124 of block 118 that couples to inlet port 126 of block 120.

Adjacent microstructure filter blocks also define a secondary inlet channel and a secondary outlet channels. For example block 118 and block 120 define a secondary inlet channel 128 and a secondary outlet channel 130. In some embodiments, the spaces between filter rows (when present) can function also as primary inlet and/or outlet channels.

Figure 4:
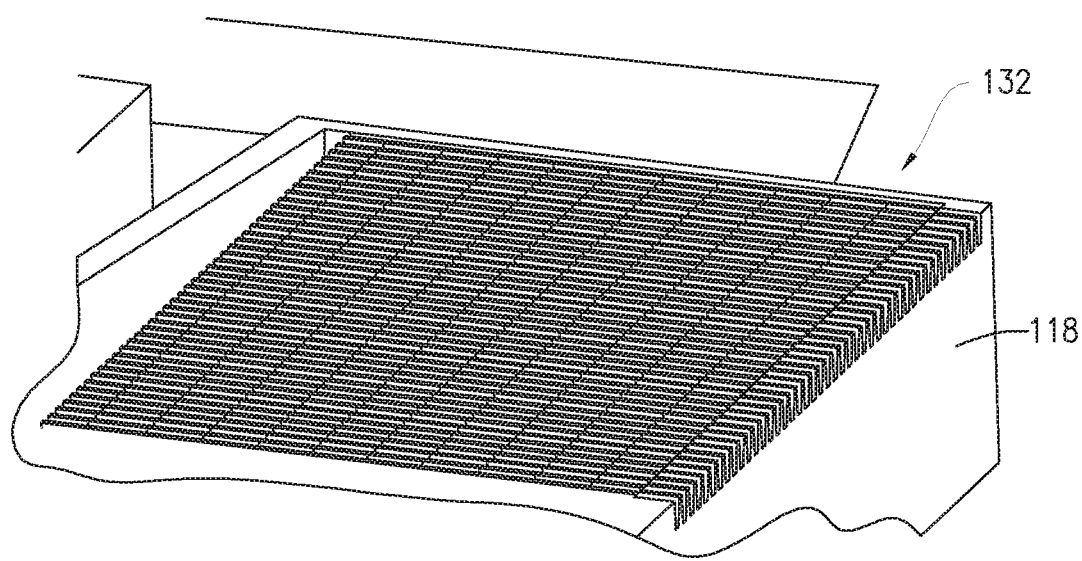
FIG. 4 is a close up view of FIG. 3 illustrating a single block of microstructure filter members (filter features).
Figure 5:
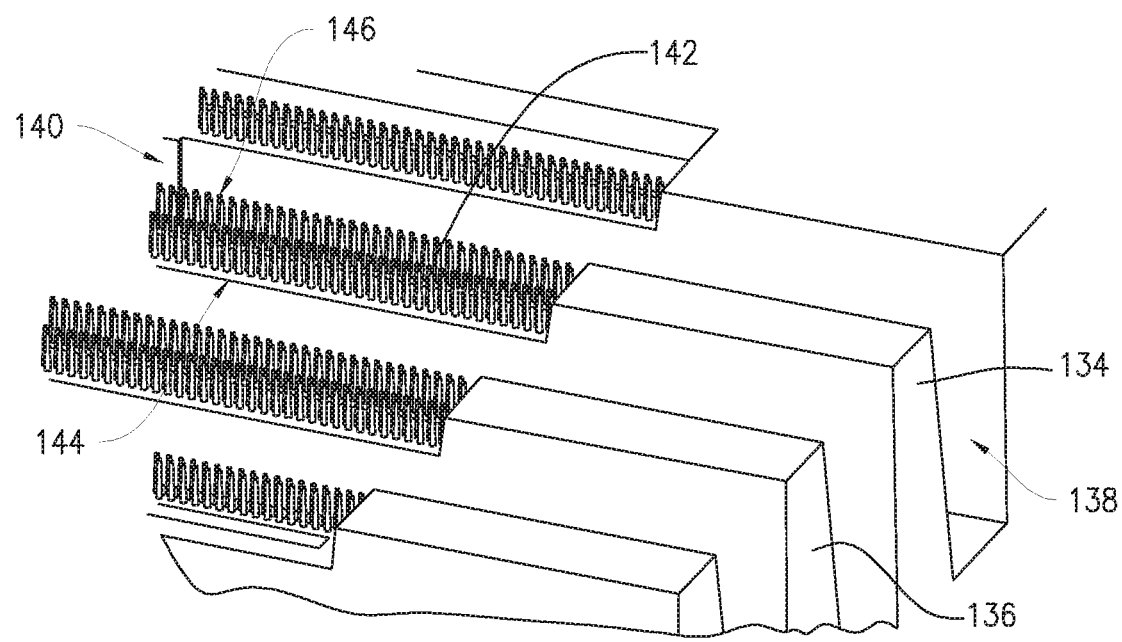
FIG. 5 is a close up view of FIG. 4, illustrating channels between microstructure filter members.

FIG. 4 illustrates microstructures 132 of block 118. FIG. 5 illustrates rows of microstructures such as adjacent rows 134 and 136. In some embodiments, the adjacent rows of microstructures define tertiary inlet and outlet channels, such as tertiary inlet channel 138 and tertiary outlet channel 140.

In the example embodiment of FIG. 5, each row, such as row 134 comprises two offset rows of posts 142. In general, quaternary inlet and outlet channels are defined by actual microstructures features. Thus, flow across the microstructure features flows from the quaternary inlets to the quaternary outlets. In one example, quaternary inlets 144 and quaternary outlets 146 are illustrated across two rows of microstructures features.

The microstructure filter members are covered with a covering or layer that partially encloses the microstructure filter member blocks to increase fluid pressure and therefore fluid velocity through the microstructure filter members. The layer or covering can also be provided by a lower surface of an adjacent filter device, which is disposed above the filter device 100, when a plurality of filter devices are stacked together.

Figure 6:
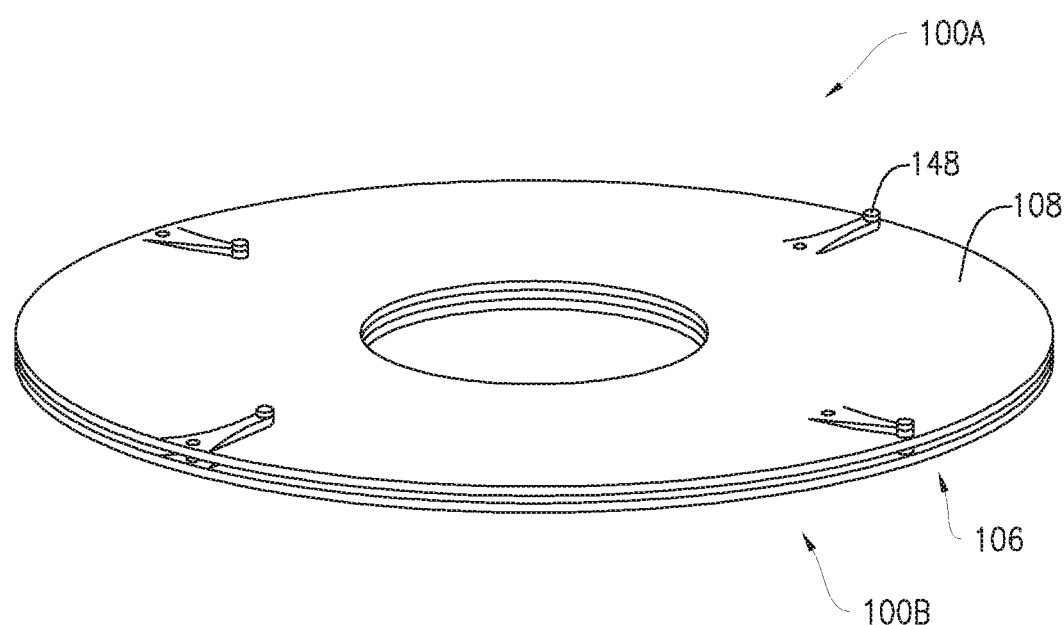
FIG. 6 is a perspective view of an underside of an example filter device.

FIG. 6 illustrates two filter devices 100A and 100B (two of the filter devices 100 of FIGS. 1-5) comprising a plurality of spacers, such as spacer 148. The spacers include resilient bodies in some instances. The spacers are resiliently biased to allow adjacent, stacked filter devices 100A and 100B to be spaced apart from one another but compressed in some applications.

Figure 7:
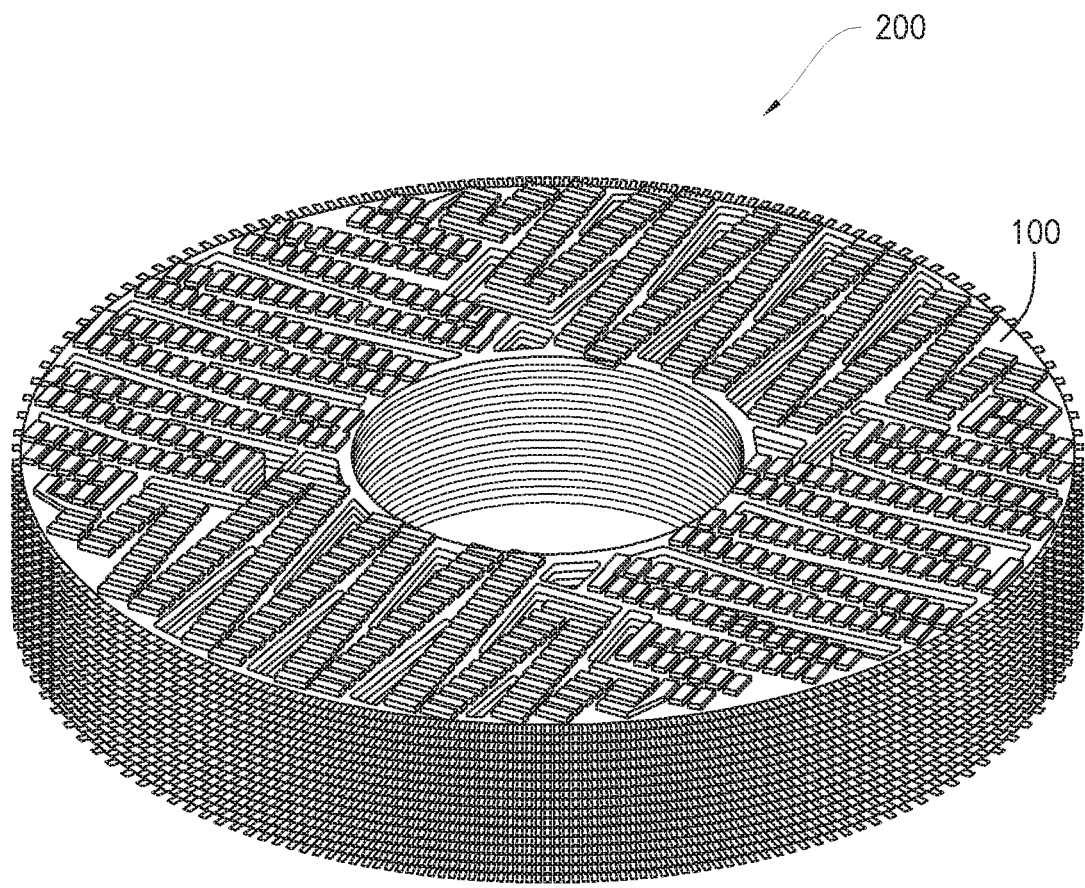
FIG. 7 is a perspective view of an example filter device that is comprised of a plurality of filter devices, such as the filter device of FIGS. 1A-6.

FIG. 7 illustrates an example filter device 200 that includes a plurality of filter devices, such as the filter device 100 of FIGS. 1A-6. The inclusion of the resilient spacers allows the filter device 200 to be compressed into a collapsed configuration. In this embodiment the filter devices are compressed into contacting or mating configuration, where a lower surface of one filter device contacts the plurality of filter rows of a lower positioned filter device. This contacting or mating configuration allows for filtering of a fluid flowing through or across the individual filter devices that comprise the filter device 200.

Figure 8:
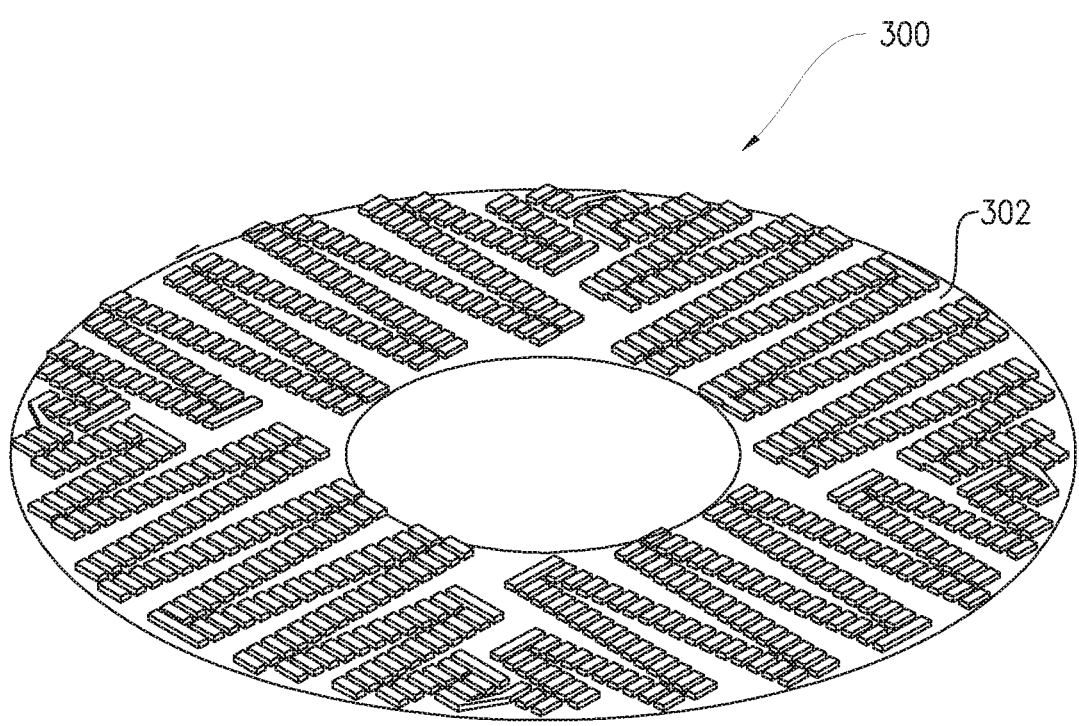
FIG. 8 illustrates another example filter device, constructed in accordance with the present disclosure.

FIG. 8 illustrates another example filter device 300 that is similar in construction to the filter device 100 of FIGS. 1A-6 with the exception that the base structure 302 does not include apertures in the spaces between the plurality of filter rows of microstructure features. Thus, other than a central aperture, the base structure is continuous.

Figure 9B:
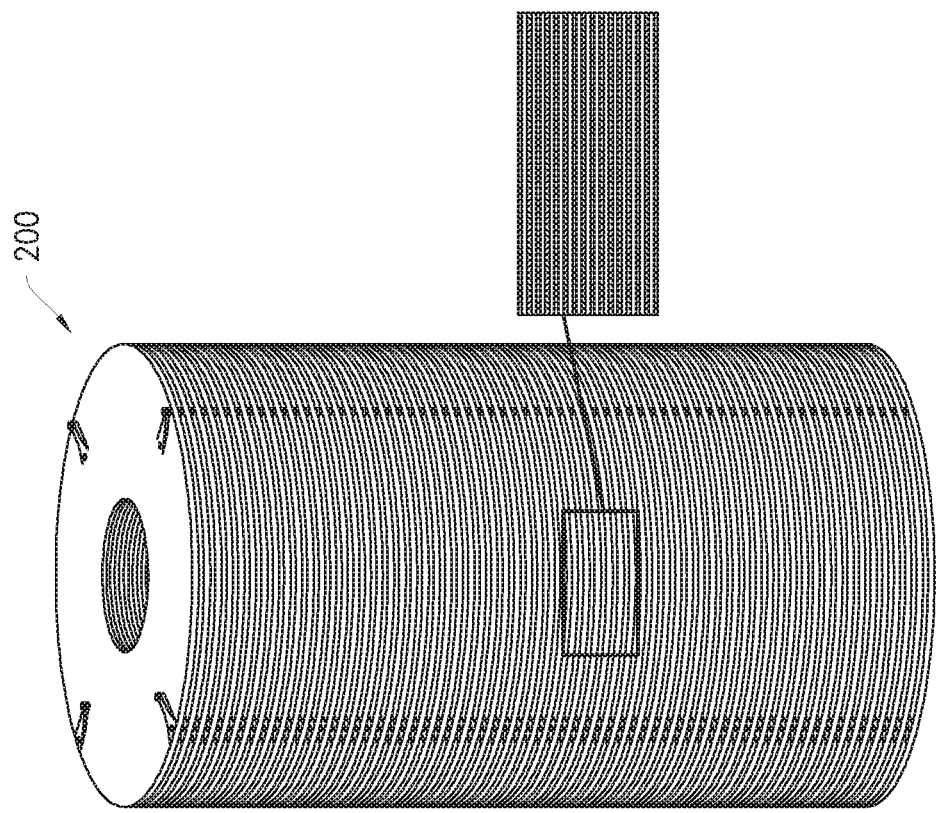
FIGS. 9A and 9B collectively illustrate another example filter device/apparatus disposed between a collapsed configuration and an expanded configuration.
Figure 9A:
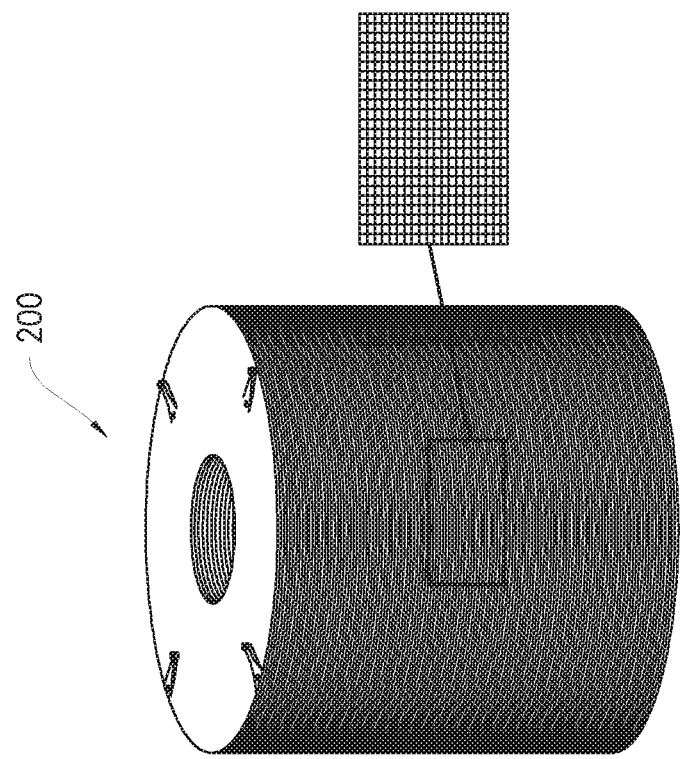

FIG. 9A illustrates another filter device/apparatus 200 in a compressed configuration. In FIG. 9B, the example filter device/apparatus 200 is disposed in an expanded configuration, which allows for cleaning of the plurality of filter devices by exposing the plurality of filter rows and the microstructure features of the plurality of filter rows to a cleaning fluid. For example, a cleaning fluid can be sprayed across the plurality of filter rows and the microstructure features to remove the particulate matter isolated by the base structure, plurality of filter rows, microstructure features, or other features of the filter devices such as rib protrusions and the like.

Figure 10:
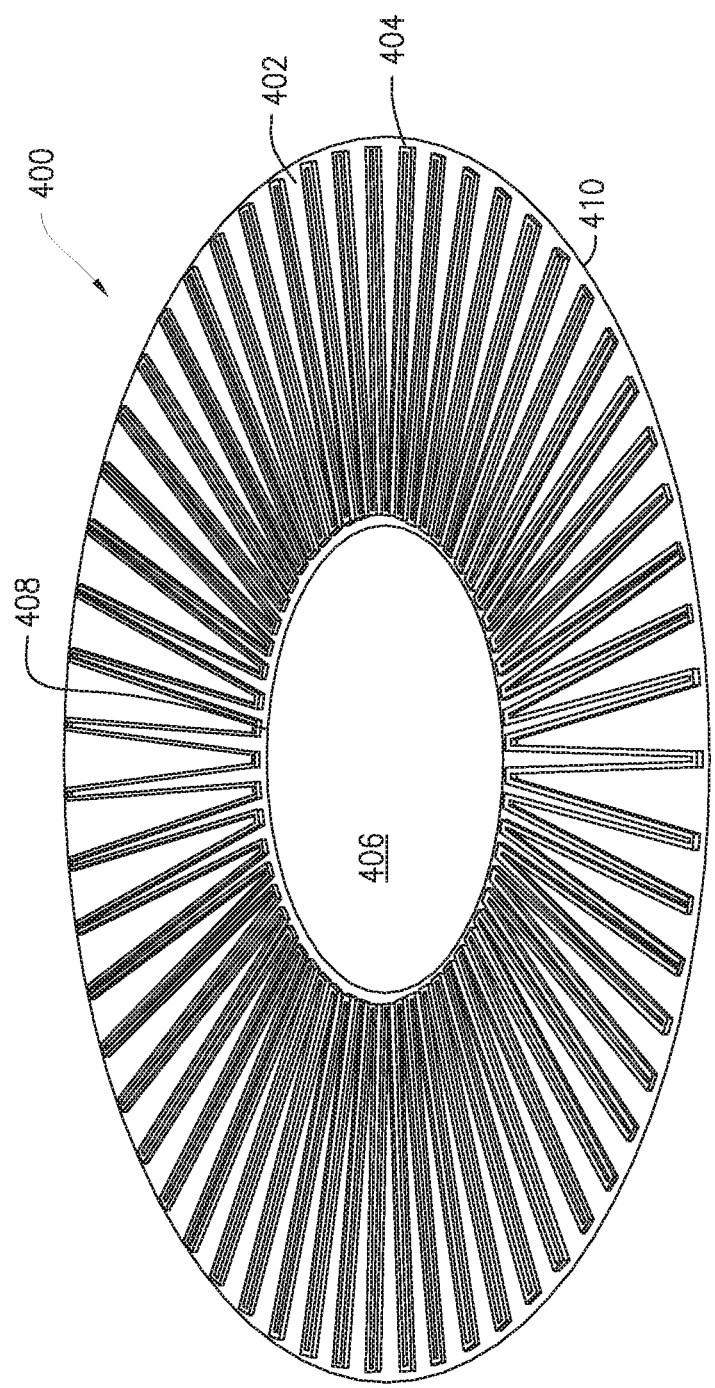
FIG. 10 illustrates an additional example filter device, constructed in accordance with the present disclosure.

FIG. 10 illustrates another example filter device 400 that includes a base structure 402 that is constructed as a disk of material, although as mentioned above other shapes are also likewise contemplated for use. The base structure 402 is provided with a plurality of filter rows, such as filter row 404 that extend between a central aperture 406 defined by an inner peripheral edge 408 of the base structure 402 and an outer peripheral edge 410 of the base structure 402.

Figure 11:
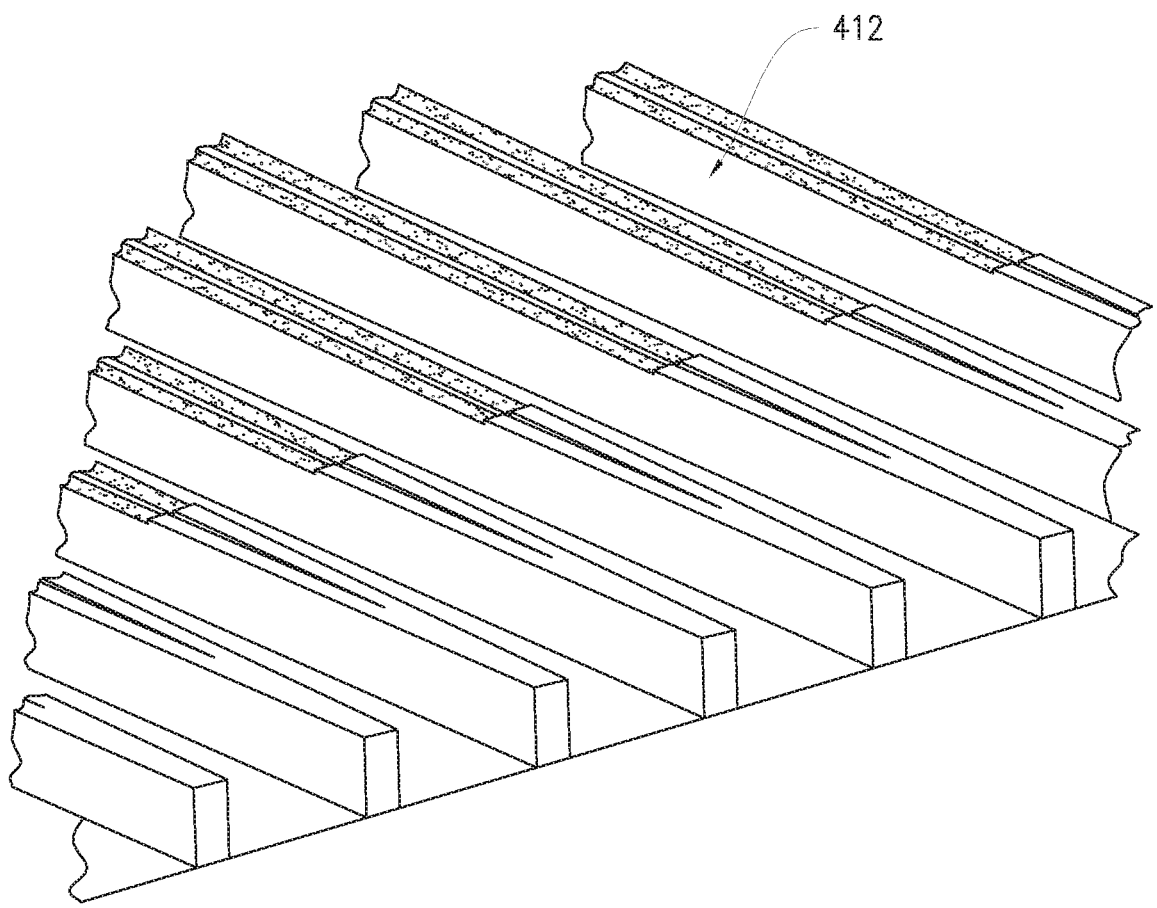
FIG. 11 is a close up perspective view of the example filter device of FIG. 10, illustrating filter rows with microstructure filter members.

The filter rows extend around the base structure in a fan pattern comprised of a series of connected v-shaped structures. In FIG. 11, a closer view of a portion of the plurality of filter rows illustrates microstructures 412. In some embodiments these microstructure features can include grooves cut into the filter row material. That is, the plurality of filter rows are solid structures and grooves are manufactured into the structural material to create the microstructures 412.

Figure 12:
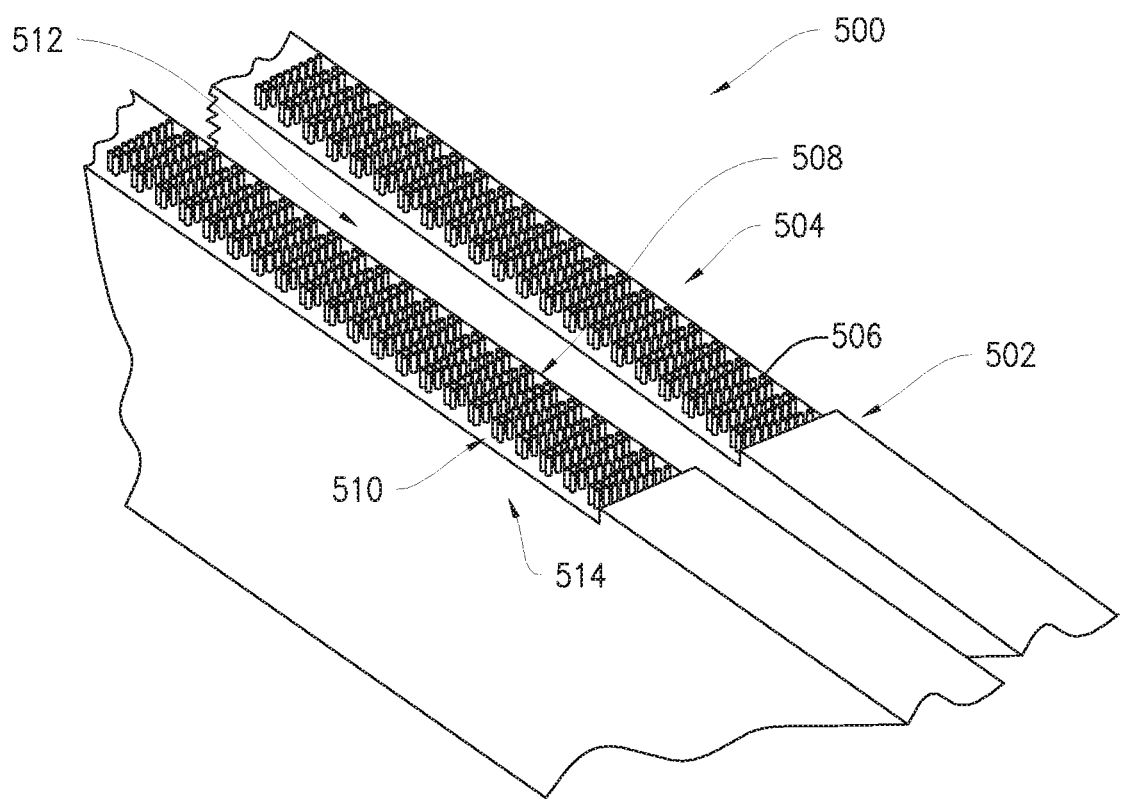
FIG. 12 is a close up perspective view of the example filter device of FIG. 11, illustrating the microstructure filter members as posts arranged in a zig-zag configuration.

Another example filter device 500 is illustrated in FIG. 12 where a plurality of filter rows 502 include microstructures 504 constructed of posts 506 that are deposited onto the filter rows 502. In one embodiment, a notch is fabricated into each of the filter rows 502 to accommodate the posts 506. In FIG. 12 the posts 506 are arranged into a zig-zag or v-shaped pattern. The posts 506 create tertiary inlet channels 508 and tertiary outlet channels 510. These tertiary inlet channels 508 and tertiary outlet channels 510 are in fluid communication with secondary inlet channels 512 and secondary outlet channels 514. Again, the defining consideration as to whether a channel is an inlet or outlet channel is dependent on the direction of fluid flow across or through the filter device 500. Thus, the designation of secondary inlet channels 512 and secondary outlet channels 514 is exemplary and not limiting.

Figure 13:
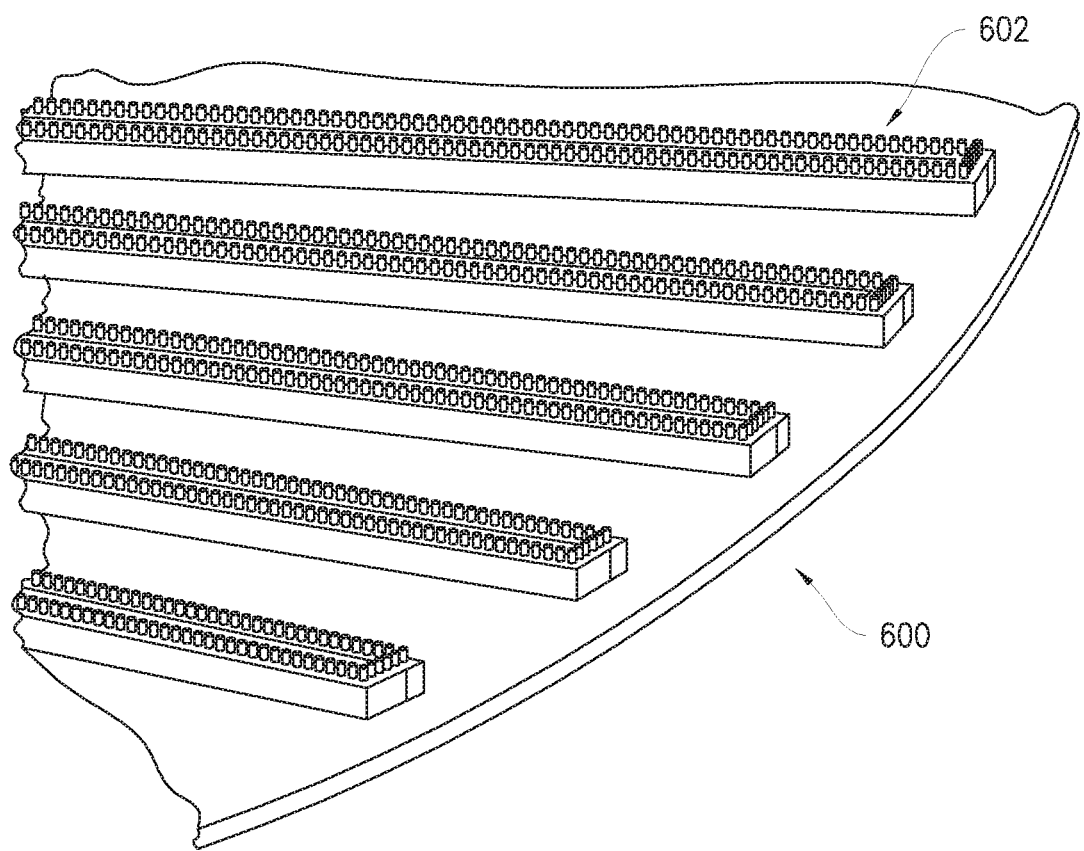
FIG. 13 is a close up perspective view of another example filter device, illustrating the microstructure filter members as posts arranged in a linear configuration.
Figure 14:
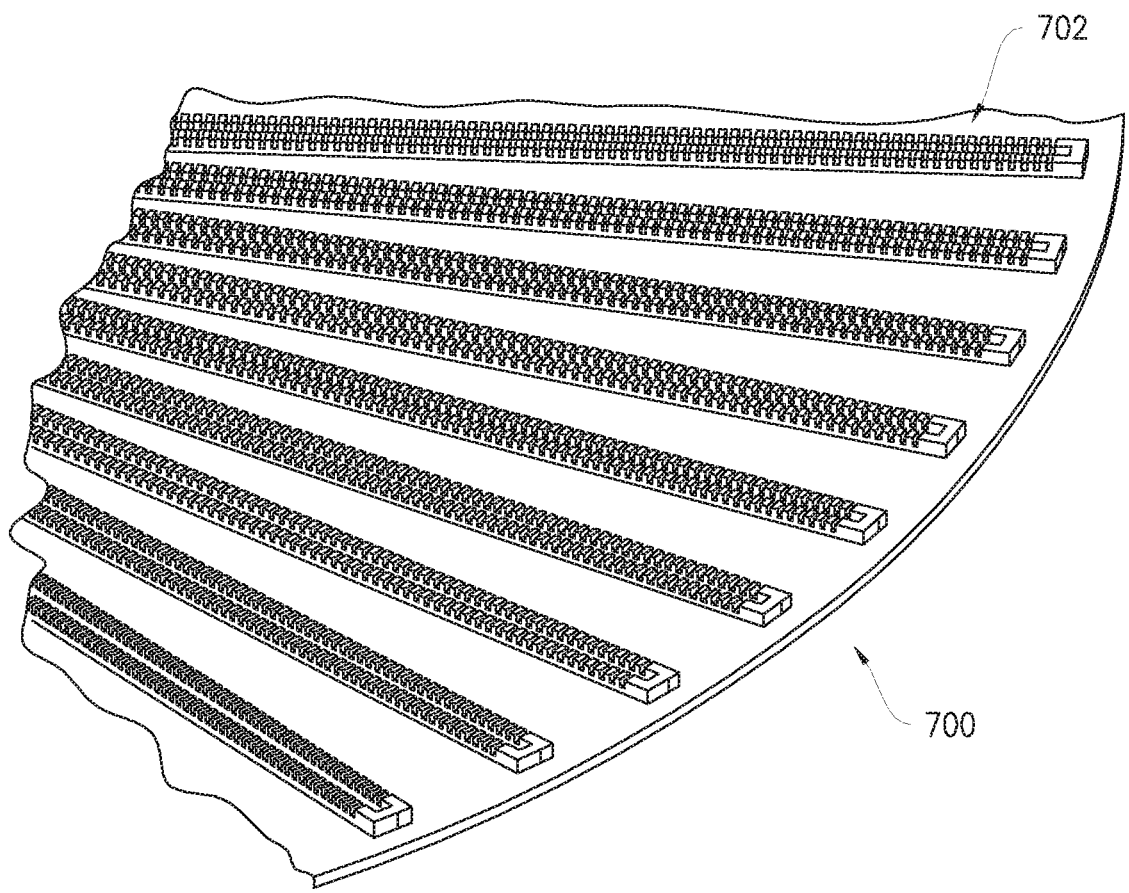
FIG. 14 is a perspective view of another example filter device that comprises microstructure filter members manufactured by grooves cut into the filter rows.

FIG. 13 illustrates an example filter device 600 that includes linear post microstructures 602. FIG. 14 illustrates an example filter device 700 that includes post style microstructures 702 arranged in a groove style configuration.

To be sure, the exact configuration of microstructure features in terms of numbers, placement, spacing, and the like are determined based on the filtering criteria established for the filter device. Thus, if the fluid requires filtering of smaller particles the microstructure features may be placed closer together and in greater numbers, as well as being arranged in more complicated patterns so as to prevent the passage of particles through the microstructure filters.

In some embodiments, an individual filter row can include different permutations of microstructure features where larger sized and wider spaced microstructure features are included on one portion of the filter row while smaller sized and more narrowly spaced microstructure features are disposed on another portion of the filter row. The smaller sized and more narrowly spaced microstructure features can be located near the outlet boundary in some embodiments.

Figure 15:
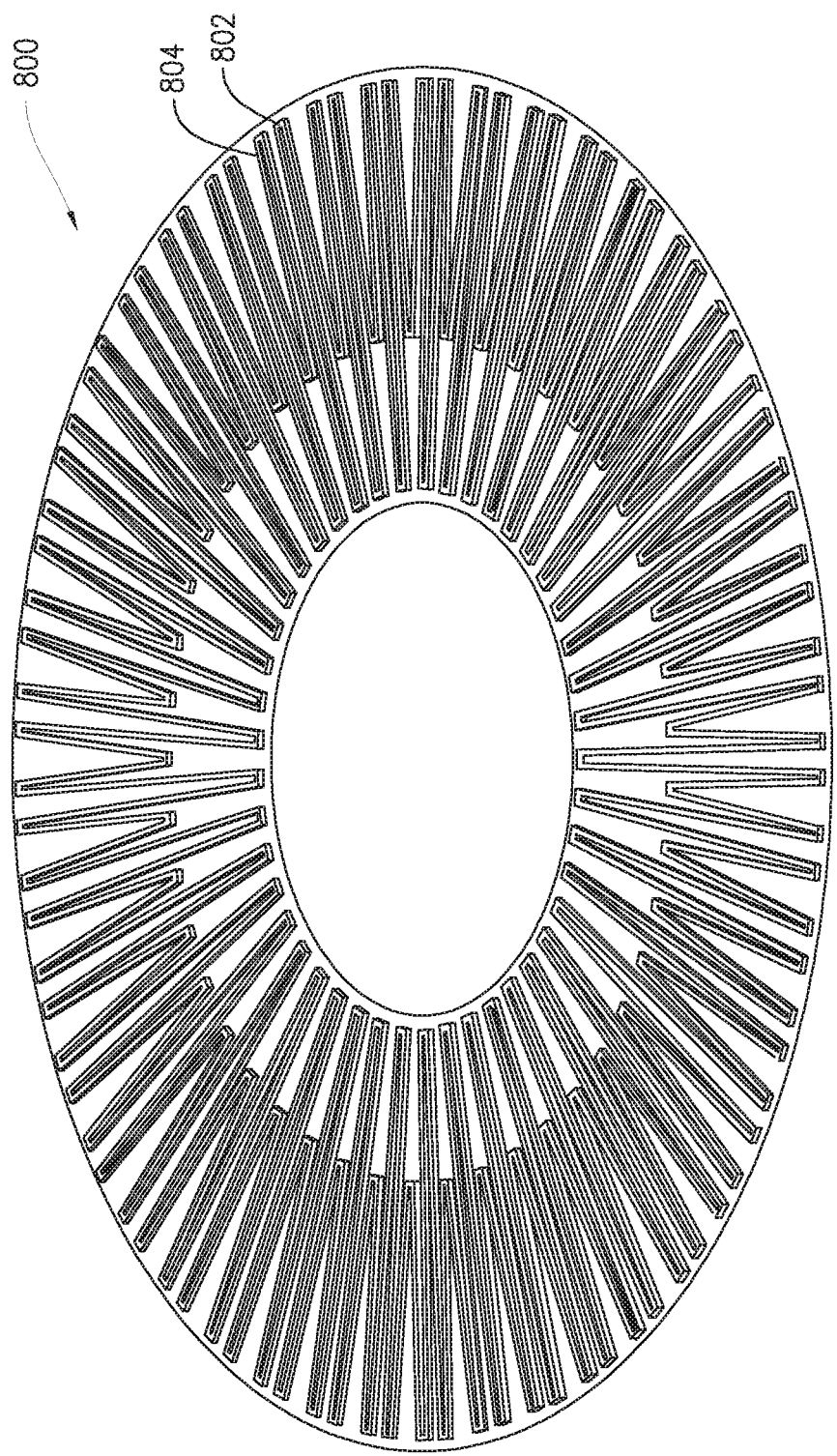
FIGS. 15 and 16 collectively illustrate a perspective view of another example filter device that comprises filter rows of alternating size.
Figure 16:
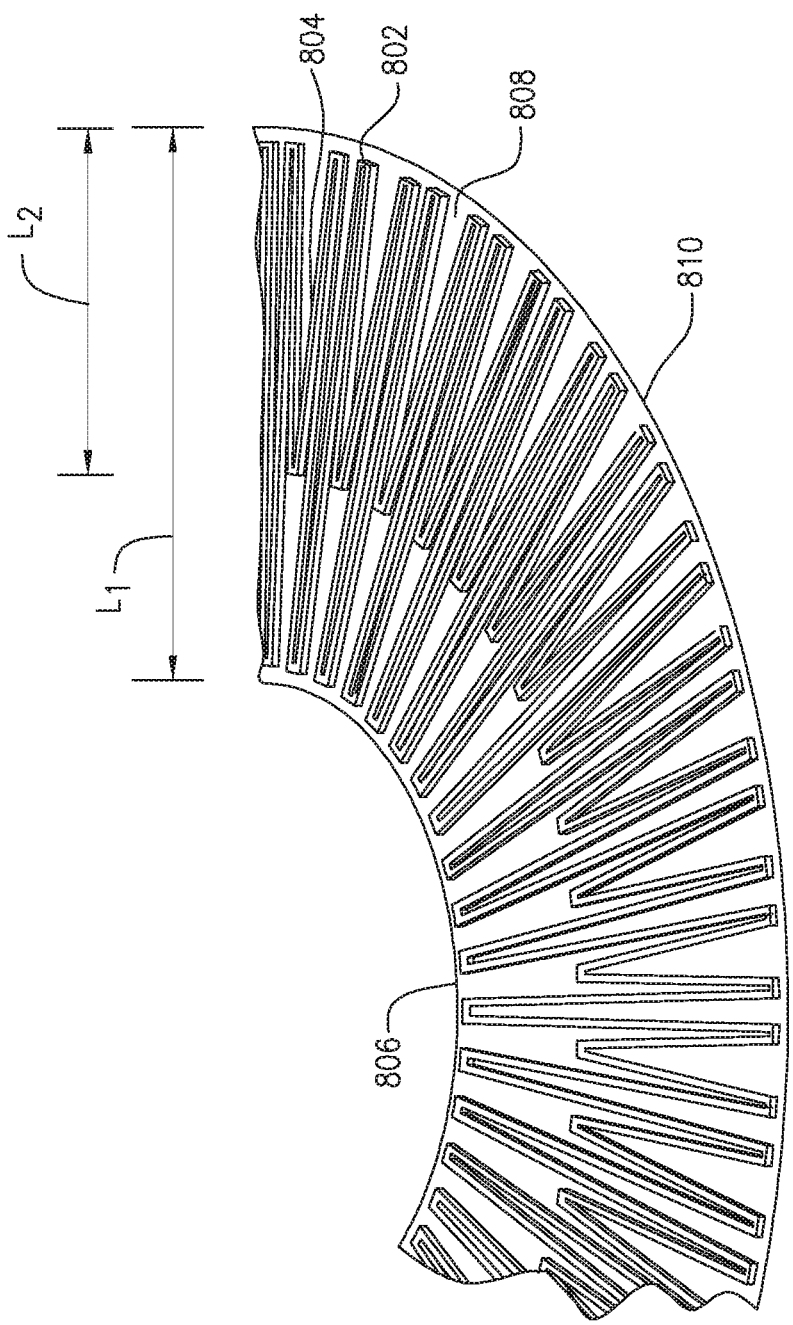

In FIGS. 15 and 16, an example filter device 800 includes a plurality of filter rows 802 that alternate in length such that a first portion of the plurality of filter rows, such as row 804, extend from an inner peripheral edge 806 of a base structure 808 to an outer peripheral edge 810 of the base structure 808. The overall length between the inner peripheral edge 806 and the outer peripheral edge 810 defines a first length $L_1$, and a second portion of the plurality of filter rows, such as row 804, extend from the outer peripheral edge 810 of the base structure 808 at a second length $L_2$ that is less than the first length $L_1$. The shorter ones of the filter rows are disposed within the longer ones of the filter rows, in some embodiments.

Figure 17:
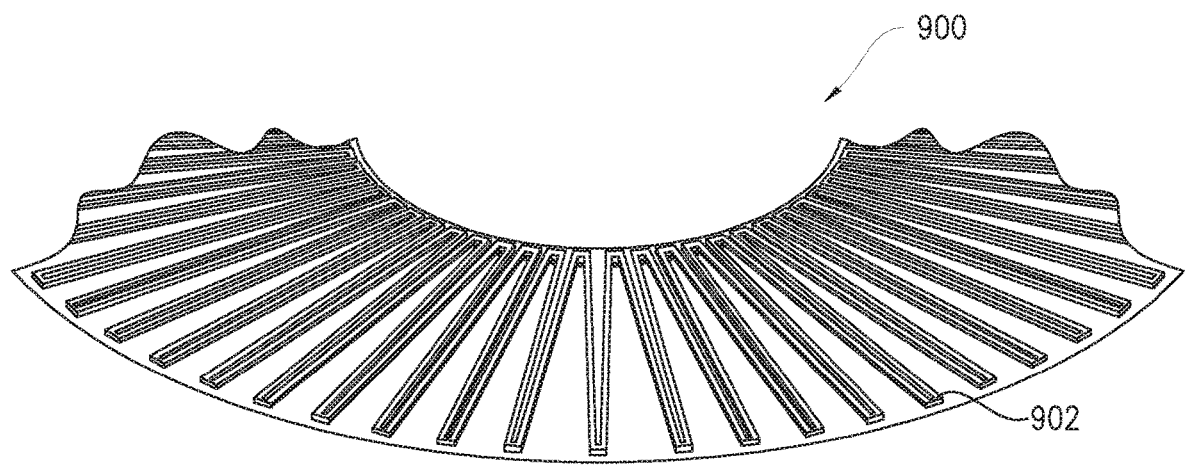
FIGS. 17 and 18 collectively illustrate a perspective view of another example filter device that comprises apertures or drain holes within the filter rows.
Figure 18:
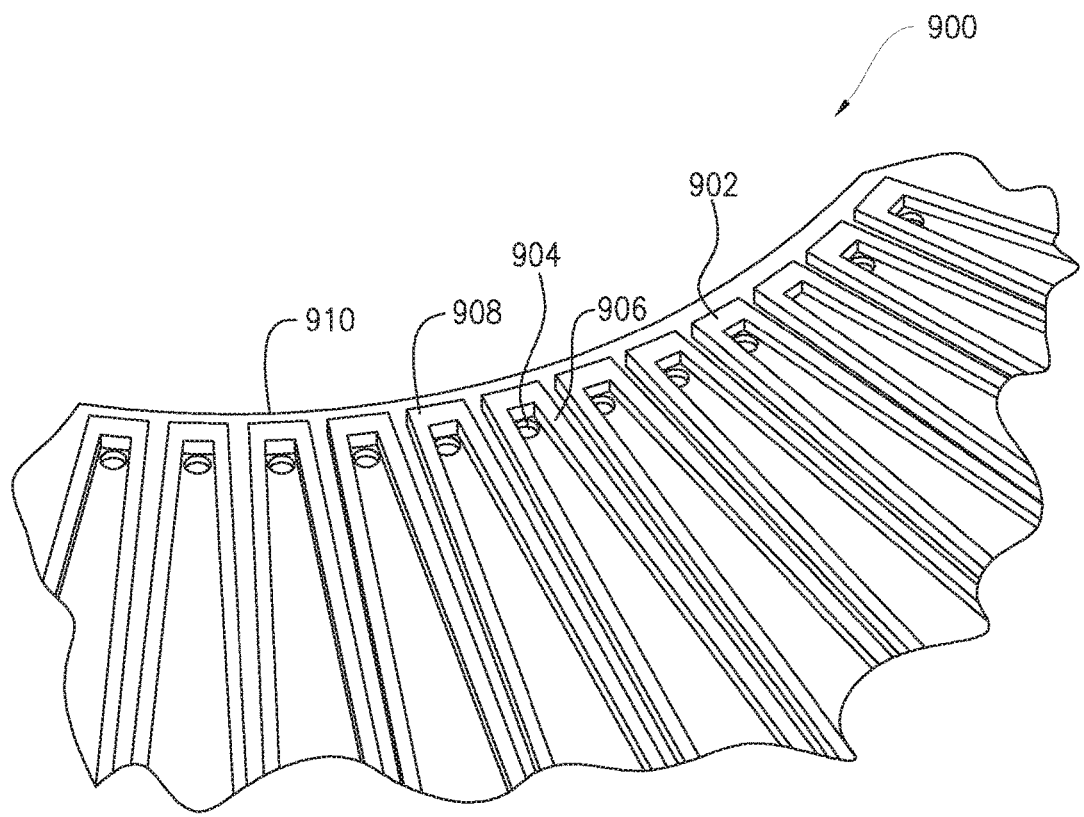

In FIGS. 17 and 18, an example filter device 900 includes a plurality of filter rows 902. An aperture, such as aperture 904 is disposed between each adjoining pair of filter rows, such as rows 906 and 908. The apertures are located near an inner peripheral edge 910, although other aperture placements and/or numbers of apertures can be utilized.

Figure 19:
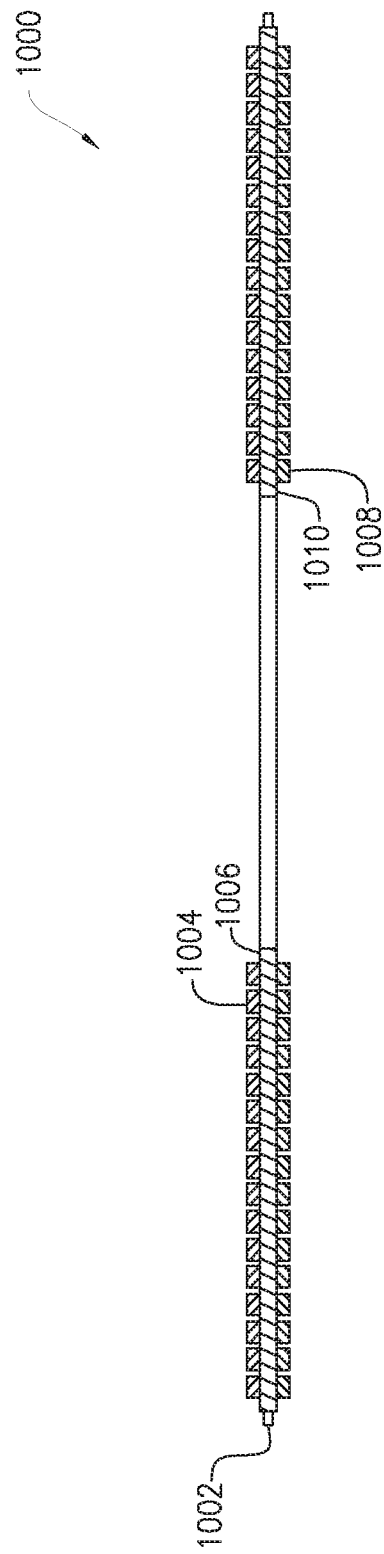
FIG. 19 is a cross sectional view of an example filter device that comprises filter rows on an upper surface and filter rows on a lower surface.

FIG. 19 illustrates another example filter device 1000 that comprises a base structure 1002 that can be constructed similarly to other base structures (such as base structure 102 of FIG. 1A). The device 1000 comprises a plurality of filter rows such as filter row 1004, which are disposed on an upper surface 1006 of the base structure 1002. The device 1000 also comprises a plurality of filter rows such as filter row 1008, which are disposed on a lower surface 1010 of the base structure 1002. Thus, filter rows are disposed on both the upper and lower surfaces of the base structure 1002.

The filter rows on the upper and lower surfaces can be similar in structure to one another, while in other embodiments the filter rows on the upper surface 1006 can have different geometrical (or microstructure features) configurations than those provided on the lower surface 1010.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, device, assembly, sub-assembly, component, and combinations thereof. Alternatively, in some embodiments the "means for" is expressed in terms of prose, or as a flow chart or a diagram.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "mechanically connected," etc., are used interchangeably herein to generally refer to the condition of being mechanically or physically connected. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," an and the are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A filter device, comprising:
a base structure comprising a primary inlet boundary and a primary outlet boundary, an upper surface of the base structure being planar and flat from an outer terminal edge of the base structure to an inner terminal edge defined by a central aperture of the base structure, the outer terminal edge meeting an outer peripheral edge of the base structure, wherein the base structure further comprises one or more resilient spacers disposed on a bottom surface of the base structure, each spacer comprising a body section cut from the base structure in such a way that the body section is attached at a first end, the body section having a spacer tip, the body section being bent away from the bottom surface of the base structure;
a plurality of filter rows disposed on and projecting from the base structure, each of the plurality of filter rows comprising:
microstructure filter members extending outwardly from the plurality of filter rows and removing particulate matter from a fluid flowing across or through the base structure, the fluid entering through the primary inlet boundary and exiting through the primary outlet boundary, wherein each of the microstructure filter members define a secondary inlet channel and a secondary outlet channel that couple to adjacent microstructure filter members, wherein the microstructure filter members are formed by a plurality of posts extending outwardly from the plurality of filter rows, the plurality of posts forming at least two rows offset with respect to one another, wherein the plurality of posts includes a first portion of spaced posts extending outwardly from the plurality of filter rows and located in a proximity of the primary inlet boundary and a second portion of smaller sized and more narrowly spaced posts relative to a size and spacing of the first portion of spaced posts, the second portion of spaced posts extending outwardly from the plurality of filter rows and being located in proximity to the primary outlet boundary; and
the primary inlet boundary being subdivided into sections defined by continuous gaps that extend between terminal ends of adjacent filter rows, the continuous gaps being defined by the outer terminal edge of the base structure.

2. The filter device according to claim 1, wherein the microstructure filter members comprise filtering protrusions that define a tertiary inlet boundary and a tertiary outlet boundary, the tertiary outlet boundary in fluid communication with the secondary outlet channel of a microstructure filter member, the tertiary inlet boundary in fluid communication with the secondary inlet channel of the microstructure filter member.

3. The filter device according to claim 1, wherein microstructure filter members are covered with cover layer pads.

4. The filter device according to claim 1, wherein the plurality of filter rows are arranged into v-shapes.

5. The filter device according to claim 1, wherein the base structure comprises a plurality of rib protrusions that ring an outer peripheral edge of the base structure, the plurality of rib protrusions filtering out large particles from the fluid when the primary inlet boundary is defined by the outer peripheral edge of the base structure.

6. The filter device according to claim 5, wherein the primary outlet boundary is defined by a central aperture in the base structure.

7. The filter device according to claim 1, wherein the base structure comprises apertures disposed within spaces between the plurality of filter rows.

8. The filter device according to claim 7, further comprising a plurality of the base structures arranged in a stacked configuration.

9. The filter device according to claim 8, wherein the apertures of the plurality of stacked base structures are aligned with one another.

10. The filter device according to claim 1, further comprising a plurality of the base structures arranged in a stacked configuration, wherein the one or more resilient spacers allow the plurality of the base structures to be placed into a compressed configuration for filtering the fluid and an expanded configuration for cleaning.

11. The filter device according to claim 1, wherein the microstructure filter members comprise filtering protrusions that define a tertiary inlet boundary and a tertiary outlet boundary, the filtering protrusions being arranged into a saw-tooth pattern defining quaternary inlet and outlet channels.

12. A filter device, comprising:
a flat base structure having an upper surface and a lower surface, the flat base structure having an outer terminal edge that meets an outer peripheral edge of the base structure and having an inner terminal edge that meets an inner peripheral edge of the base structure, wherein the base structure further comprises one or more resilient spacers disposed on a bottom surface of the base structure, each spacer comprising a body section cut from the base structure in such a way that the body section is attached at a first end, the body section having a spacer tip, the body section being bent away from the bottom surface of the base structure; and
a plurality of filter rows disposed on and projecting from any of the upper surface, the lower surface, and combinations thereof, each of the plurality of filter rows comprising microstructure filter members extending outwardly from the plurality of filter rows and removing particulate matter from a fluid flowing across or through the flat base structure, the plurality of filter rows being arranged onto the upper surface to form v-shaped grooves that define primary channels, at least a portion of the plurality of filter rows having differing lengths relative to one another and differing amounts of microstructure filter members relative to one another, wherein the microstructure filter members of the plurality of filter rows are formed by a plurality of posts extending outwardly from the plurality of filter rows, the plurality of posts forming at least two rows offset with respect to one another, wherein the plurality of posts includes a first portion of spaced posts extending outwardly from the plurality of filter rows and located in a proximity of the primary inlet boundary and a second portion of smaller sized and more narrowly spaced posts relative to a size and spacing of the first portion of spaced posts, the second portion of spaced posts extending outwardly from the plurality of filter rows and being located in proximity to the primary outlet boundary.

13. The filter device according to claim 12, wherein the microstructure filter members are formed by grooves cut into the plurality of filter rows.

14. The filter device according to claim 12, wherein the microstructure filter members are formed by posts extending from the plurality of filter rows.

15. The filter device according to claim 14, wherein the posts extend in a saw-tooth pattern forming secondary inlet and outlet channels.

16. The filter device according to claim 12, wherein the plurality of filter rows alternate in length such that a first portion of the plurality of filter rows extend from an inner peripheral edge of the base structure to an outer peripheral edge of the base structure, which defines a first length, and a second portion extend from the outer peripheral edge of the base structure at a second length that is less than the first length.

17. The filter device according to claim 12, wherein at least a portion of the plurality of filter rows comprise an aperture that increases fluid flow thorough the structure.

18. The filter device according to claim 12, further comprising a plurality of the base structures arranged in a stacked configuration, wherein the one or more resilient spacers allow the plurality of the base structures to be placed into a compressed configuration for filtering the fluid and an expanded configuration for cleaning.

19. The filter device according to claim 18, wherein the base structure is charged to attract particles within the fluid.

20. The filter device according to claim 18, wherein the base structure is electrically charged to create an electric field across the fluid as it flows along or through the base structure.

21. A filter device, comprising:
   a plurality of filter devices, each of the filter devices comprising:
     a base structure, comprising:
       one or more resilient spacers disposed on a bottom surface of the base structure, each spacer comprising a body section cut from the base structure in such a way that the body section is attached at a first end, the body section having a spacer tip, the body section being bent away from the bottom surface of the base structure;
       an upper surface;
       a lower surface; and
    a plurality of filter rows disposed on and projecting from any of the upper surface, the lower surface, and combinations thereof, each of the plurality of filter rows comprising microstructure filter members extending outwardly from the plurality of filter rows and removing particulate matter from a fluid flowing across or through the base structure, the plurality of filter rows being arranged onto the upper surface to form v-shaped grooves that define primary channels, wherein the microstructure filter members are formed by a plurality of posts extending outwardly from the plurality of filter rows, the plurality of posts being arranged into any of v-shaped rows and at least two rows offset with respect to one another, wherein the plurality of posts includes a first portion of spaced posts extending outwardly from the plurality of filter rows and located in a proximity of the primary inlet boundary and a second portion of smaller sized and more narrowly spaced posts relative to a size and spacing of the first portion of spaced posts, the second portion of spaced posts extending outwardly from the plurality of filter rows and being located in proximity to the primary outlet boundary.

* * * * *